United States Patent
Justin

(10) Patent No.: US 8,784,247 B2
(45) Date of Patent: Jul. 22, 2014

(54) DRIVE ARRANGEMENT FOR A VEHICLE ACCESSORY

(75) Inventor: Thomas Justin, Brignais (FR)

(73) Assignee: Renault Trucks, St. Priest (FR)

( * ) Notice: Subject to any disclaimer, the term of this patent is extended or adjusted under 35 U.S.C. 154(b) by 174 days.

(21) Appl. No.: 13/513,889

(22) PCT Filed: Dec. 10, 2009

(86) PCT No.: PCT/IB2009/008004
§ 371 (c)(1),
(2), (4) Date: Jun. 5, 2012

(87) PCT Pub. No.: WO2011/098845
PCT Pub. Date: Aug. 18, 2011

(65) Prior Publication Data
US 2012/0252620 A1    Oct. 4, 2012

(51) Int. Cl.
*F16H 3/72* (2006.01)
(52) U.S. Cl.
USPC .................................................... 475/5
(58) Field of Classification Search
CPC .................................. F16H 3/72; F16H 3/724
USPC ................................................................ 475/5
See application file for complete search history.

(56) References Cited

U.S. PATENT DOCUMENTS

| | | | |
|---|---|---|---|
| 2,227,801 A * | 1/1941 | Trofimov | 475/5 |
| 3,469,473 A * | 9/1969 | Förster et al. | 475/153 |
| 3,596,524 A * | 8/1971 | Cook | 74/15.4 |
| 5,309,778 A | 5/1994 | Antonov | |
| 2006/0240937 A1 * | 10/2006 | Shiotsu et al. | 475/286 |
| 2007/0149336 A1 | 6/2007 | Sallstrom | |
| 2008/0020887 A1 * | 1/2008 | Moeller | 475/204 |

FOREIGN PATENT DOCUMENTS

| | | |
|---|---|---|
| DE | 4333907 A1 | 6/1995 |
| EP | 1992840 A1 | 11/2008 |
| JP | 2004122979 | 4/2004 |
| JP | 2008501884 | 1/2008 |
| WO | 2004072449 A1 | 8/2004 |
| WO | 2005119023 A1 | 12/2005 |

OTHER PUBLICATIONS

Official Action (translation) (Jun. 5, 2013) from corresponding Japanese Application JP 2012-524626.
JPH03-505316 (abstract) (Nov. 21, 1991) (corresponds to 5309778 listed above).
International Search Report (Sep. 1, 2012) for corresponding International application No. PCT/IB2009/008004.

* cited by examiner

*Primary Examiner* — Sherry Estremsky
(74) *Attorney, Agent, or Firm* — WRB-IP LLP

(57) ABSTRACT

A drive arrangement for auxiliary equipment of an engine includes an epicyclical gear having a sun gear, a ring gear and a planet carrier. A first component is connected to the engine, a second component is connected to a first electric machine, and a third component is connected to the auxiliary equipment. The first component is guided in rotation on the engine block and includes a rigid assembly which supports the other two components. The stator of the first electric machine is fixed on a holder. The holder is guided in rotation directly or indirectly on the first component rigid assembly, and the first component is guided in rotation on the engine block independently from the holder.

13 Claims, 3 Drawing Sheets

DRIVE ARRANGEMENT FOR A VEHICLE ACCESSORY

BACKGROUND AND SUMMARY

The invention relates to a drive arrangement for at least one auxiliary equipment of an internal combustion engine having an engine block and a rotating output member, wherein the drive arrangement comprises an epicyclical gear having three main components consisting of or comprising a sun gear, a ring gear and a planet carrier, and wherein:
- a first component is to be connected to the engine rotating output member,
- a second component is to be connected to the rotor of a first electric machine having also a stator, and
- a third component is to be connected to said at least one auxiliary equipment.

Such a drive arrangement can be especially used for an engine installation mounted on a vehicle, where the engine is the vehicle's traction engine, but also for stationary engine installations. Document U.S.-2008/0020887 discloses a drive arrangement of the type above. Such an arrangement is very useful in order to be able to adapt the speed of the auxiliary equipment independently of the speed of the traction engine. Indeed, in previous drive arrangements, the accessory would be in most cases directly driven by the engine, through a constant speed ratio transmission. Therefore, the speed of the auxiliary equipment would follow the speed of the engine. Unfortunately, in many cases, there is not a direct connection between the optimal speed profile of the auxiliary equipment and the optimal speed profile of the engine. Basically, in a vehicle, engine speed is linked to the vehicle speed. Therefore, when the vehicle is running at high speed, the engine is also operating at a relatively high speed. On the other hand, it may at that time not be necessary to drive the accessory at high speed. For example, an engine cooling fan does not need to operate when the vehicle is at high speed, simply because the air flow due to the vehicle speed is in most cases enough for achieving the necessary cooling of the engine. Similarly, an alternator delivering electricity to on-board accessories does not necessarily need to deliver its full power if, at the same time, the main electric consumers, such as the headlights, the defogging resistors, the windshield wipers, etc., do not operate. Of course, engine speed is also related to which gear of the gearbox is engaged, which, in many cases, has no direct connection with the needs of the auxiliaries. Therefore, in many cases, previous systems with direct drive of the auxiliary equipment by the engine tend to generate power losses because the auxiliary equipment is not driven at the right speed. Inversely, auxiliary equipment sometimes needs to be over-designed to deliver sufficient performance while driven at low speeds when the engine is at low speeds. Therefore, a drive system as in U.S.-2008/0020887 has the great advantage that it allows operating the auxiliary equipment at a more appropriate speed, whatever the instant operating speed of the engine. Nevertheless, the drive system as in U.S.-2008/0020887 is quite complex in terms of its number of parts. Also, several parts of the system, which need to be aligned because they cooperate via gearings, are mounted on different static parts, so that, to ensure proper alignment, very stringent dimensional requirements are needed for the system to operate properly.

Document DE-102.14.637 discloses a similar type of drive arrangement. This drive arrangement is dedicated to driving a pump. The design of the drive arrangement is adapted to the fact that such a pump is rigidly fixed to the engine through its casing. The drive arrangement is therefore build around the casing of the pump. Similarly, very stringent dimensional requirements appear necessary for the many parts of the system to be properly aligned.

In view of the above prior art, there remains a need for a drive system of type described above, but with an architecture capable of being embodied in a simpler manner.

According to an aspect of the invention, a drive system of the type described above is characterized in that said first component which is to be connected to the engine rotating output member is guided in rotation by a strict pivot connection on the engine block and comprises a rigid assembly which supports the other two components, in that the stator of the first electric machine is fixed on a holder, said holder being guided in rotation by a strict pivot connection directly or indirectly on said first component rigid assembly, and in that the first component is guided in rotation on the engine block independently from the holder.

DETAILED DESCRIPTION

Figure 1:
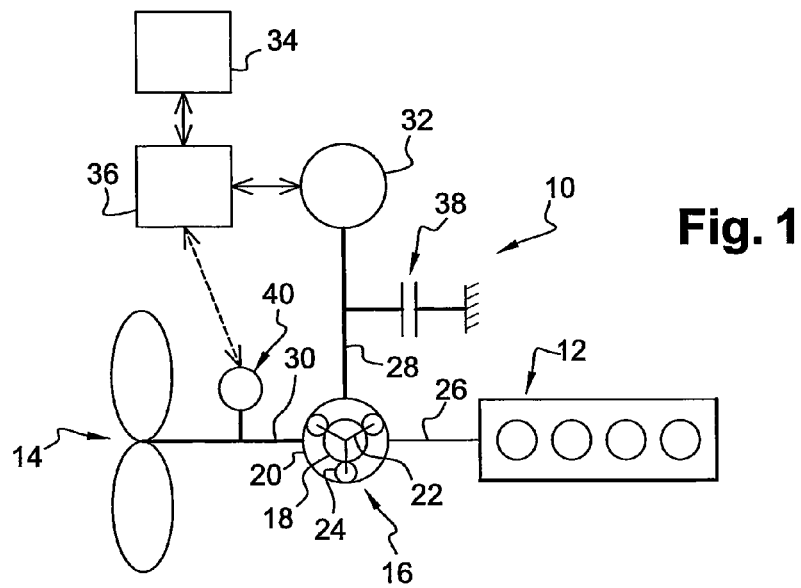
FIG. 1 is a schematic diagram illustrating an installation of a drive arrangement for driving an auxiliary equipment such as a cooling fan.

On FIG. 1 is shown an installation 10 which can for example be mounted onboard a vehicle. The installation comprises a main engine, or traction engine 12, which, in most cases will be an internal combustion engine, such as a Diesel engine. The traction engine is the main source of mechanical power for the vehicle, thereby providing the power to drive the vehicle, through a non represented suitable transmission. The transmission can be mechanical, hydraulic, electric, a combination thereof, etc. . . This installation comprises at least one auxiliary equipment which, in the example disclosed herein is a cooling fan 14 for the engine 12, which needs to be mechanically driven and which, in the installation, will be at least partly mechanically driven by the engine 12. Of course, other auxiliary equipment could be driven by such drive arrangement, such as an air compressor, a hydraulic pump, etc. . . According to the invention, the auxiliary equipment 14 is driven by the engine 12 through an epicyclical gear 16 having three main components consisting of or comprising a sun gear 18, a ring gear 20 and a planet carrier 22 which are coaxial around an axis A1 and are respectively associated to one of three input/output couplings. The sun gear, the ring gear and the carrier are rotatable one to the other around their common axis, and the carrier carries rotatable satellite gears 24 which are meshed with both the sun gear 18 and the ring gear 20. In such a gear, the speed of the three inputs/outputs are linked one to the other in a way such as the speed of one of the input/outputs is a linear combination of the speeds of the other two input/outputs. As represented on FIG. 1, a first component of the epicyclical gear 16 is to be connected through a first coupling 26 to the traction engine 12, more precisely to a rotating output member of the engine, a second component is to be connected through a second coupling 28 to a first electric machine 32, while a third component is to be connected through a third coupling 30 to the auxiliary equipment 14.

In each case, the coupling can be any type of transmission device capable of transmitting the rotating movement of the epicyclical gear to and from the engine, the electric machine, and the auxiliary equipment, respectively. Such coupling can include for example a shaft, and/or a gear transmission, and/or a pulley transmission, etc. . . . The coupling can ensure a fixed speed ratio between the component and the engine, the electric machine, and the auxiliary equipment, respectively, or a speed ratio which is variable, either in steps or continuously.

The first electrical machine 32 is preferably reversible, such as an electric motor/generator, and it is connected to an electric network 34, which may be dedicated to the drive arrangement or preferably shared with other elements of the vehicle, for example through an electronic power control unit 36. The electric network 34 may include an electrical energy storage system such as a battery. The first electric machine comprises a rotor 32R and a stator 32S.

The main purpose of such a drive arrangement is well known in that it forms, between the engine 12 and the auxiliary equipment 14, a sort of continuously variable ratio transmission, the ratio of which can be controlled by controlling the speed of the first electrical machine 32.

As will be discussed more in detail hereunder, the drive arrangement may further comprise a mechanical lock 38 for locking the second component which is connected to the first electric machine 32, so as to prevent any rotation of said second component of the epicyclical gear 16 around the axis of the epicyclical gear. When the second component is locked, the drive arrangement forms a fixed ratio transmission between the engine 12 and the auxiliary 14 where the ratio is simply determined by the respective geometry of the components of the epicyclical gear 16. When such ratio is satisfactory for an optimal operation speed of both the engine and the auxiliary, locking the mechanical lock avoids any electric losses in the drive arrangement.

Also, a second electric machine 40 may be provided with its rotor connected to both the auxiliary equipment 14 and the third component. The second electric machine is preferably then electrically connected to the electrical network 34 through an electronic power control unit. The second electrical machine is preferably reversible and may have several uses, but most importantly can be used as a generator when the first electrical machine is used as a motor, and inversely, thereby minimizing the need for the drive arrangement to exchange electrical energy with the electrical network in one way or the other.

A first embodiment of the invention will now be described in connection with FIG. 2. In this example, the first component which is connected to the engine 12 is the carrier 22, the second component which is connected to the first electric machine 32 is the ring 20 and the third component connected to the auxiliary 14 is the sun 18.

The first component comprises a rigid assembly which, as will be seen hereunder, supports the other two components of the epicyclical gear 16. The rigid assembly has a radial part 22R which extends radially away from the axis A1. The radial part 22R holds at least one planet pin, parallel to axis A1 on which a planet gear 24 is rotatably mounted around the axis Ap1 of the pin. Preferably, the epicyclical gear 16 has several planet gears 24, for example three of them, and the radial part 22R may therefore hold several pins parallel to axis A1, distributed angularly around axis A1, and each pin receiving one planet gear. The rigid assembly further comprises an axial part 22A which extends along axis A1 between a proximal end and a distal end. The axial part 22A of the rigid assembly is in the form of a shaft on which can be formed pivot connection portions for supporting directly or indirectly all the other components of the drive assembly in a strict pivot connection. In this text, proximal means axially turned towards the engine block, i.e. to the right on the Figures, and distal means turned away from the engine block, i.e. to the left on the Figures. The radial and axial parts of the rigid assembly may be formed of one part, or, as shown on FIG. 2, of several parts rigidly connected one to the other without any substantial freedom of movement between them, thereby forming a rigid entity. In this first embodiment, the pins and the planet gears they receive are located on the distal side of the radial part 22A of the planet carrier component.

This first component, which is to be connected to the engine rotating output member, is guided in rotation by a strict pivot connection on the engine block. By strict pivot connection, it is meant that the connection authorizes only one degree of freedom of movement: a rotation around the axis A1 of the epicyclical gear 16. In a preferred embodiment, the first component is rigidly mounted directly or indirectly on the engine crankshaft, as the crankshaft is indeed guided in rotation by a strict pivot connection on the engine block.

Figure 2:
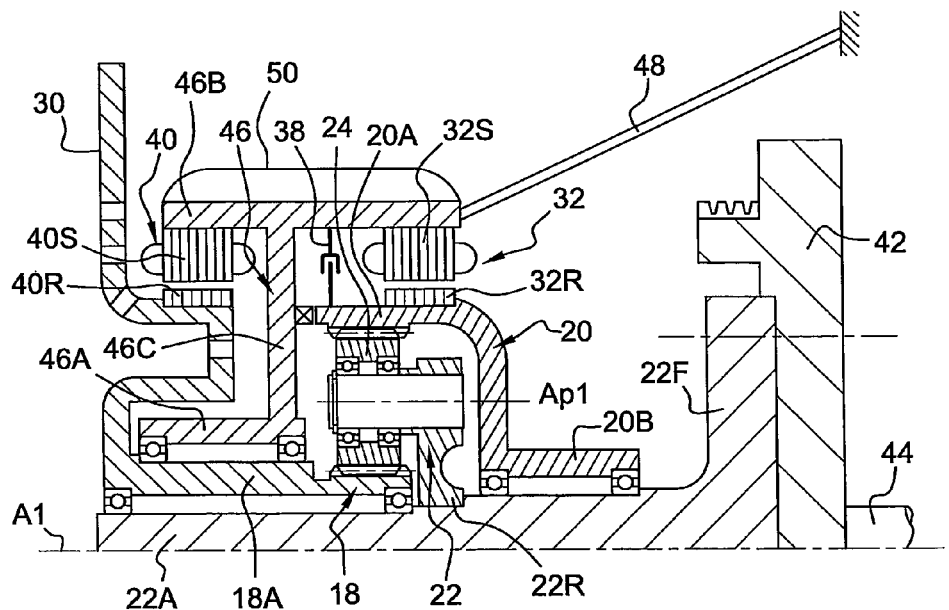
FIGS. 2 to 6 represent very schematically in cross-section five embodiments of a drive arrangement according to the invention. Only an upper half, above the main axis of the arrangement, is shown on these Figures.

In the embodiment of FIG. 2, the proximal end of the axial part 22A of the rigid assembly exhibits a radial flange portion 22F through which the rigid assembly is fixed, for example by a series of screws, to the front face of a pulley 42. The pulley 42 can be a known pulley which is mounted to the front end of the engine crankshaft 44 and which is used to drive other accessories through a belt. Therefore, in this example, the rigid assembly can be considered to be mounted directly on the engine crankshaft, by the proximal end of its axial part 22 A, through the pulley 42. In other words, the rigid assembly of the first component is attached as an extension to the engine output shaft. Therefore, the axis A1 of the rigid assembly, which is also the axis of the epicyclical gear 16, is coaxial with the axis of the crankshaft of the engine, and it is well understood that the engine crankshaft then directly drives the rotation of the first component. In another embodiment, the rigid assembly could be mounted on the engine block at another location. For example, the rigid assembly could be mounted to one of the timing gears which are conventionally mounted by a strict pivot connection on the front face of the engine block. In such a case, the axis A1 of the first component would be distinct from the axis of the engine crankshaft and the first component would be driven at the same speed as the timing gear to which it is mounted. In still another embodiment, the rigid assembly could be mounted on the engine block through a dedicated strict pivot connection. Is such a case, it can be driven by a cascading gear set, comparable to the timing gears set, or by a pulley transmission. In any case, the first component is driven either directly by the engine crankshaft or indirectly by any other engine rotating output member such as a camshaft or any other power take-off.

As said above, the other two components of the epicyclical gear are supported by the rigid assembly which is part of the first component. Preferably, the second and third main components are each mounted directly or indirectly on said first component rigid assembly through a strict pivot connection on a single rigid entity.

In the example of FIG. 2, it can be seen that the ring component 20 has a cylindrical gearing portion 20A which has an internal gearing teeth for engaging the planet gears, and a pivot portion 20B which is formed as a tube axially offset from the cylindrical gearing portion in the proximal direction and connected to the gearing portion by a radial connecting portion. The cylindrical gearing portion 20A encompasses the planet carrier radial part 22R and the planet gears 24. The pivot portion 20B of the ring component is mounted by two ball bearings on a corresponding pivot connection portion of the axial part 22A of the rigid assembly which extends axially towards the proximal end from the radial part 22R. The sun component 18 also has a tubular pivot portion 18A which is mounted by two ball bearings on a corresponding pivot connection portion of the axial part 22A of the rigid assembly which extends axially towards the distal end from the radial part 22R. The pivot portion 18A of the sun component has, on the external surface of its proximal end, the sun gearing teeth for engaging the planet gears 24. At its distal end, the pivot portion 18A of the sun component has a radial portion which serves as a coupling 30 on which a fan blade can be mounted.

According to another feature, the stator 32S of the first electric machine 32 is fixed on a holder 46, said holder being guided in rotation by a strict pivot connection directly or indirectly on said first component rigid assembly.

In the embodiment of FIG. 2, the holder 46 is in fact guided in rotation through two ball bearings on the external surface of the pivot portion 18A of the third component which is, in this case, the sun component as described above. Therefore, in this case, the holder 46 is indirectly guided on the first component rigid assembly, but it is worth noting that the holder is mounted through a strict pivot connection on a single rigid entity, here the third component which is itself mounted through a strict pivot connection on a single rigid entity, the rigid assembly of first component 22. Therefore, each element being mounted on a single rigid entity, it is quite easy in manufacturing terms to ensure a proper axial alignment of all these elements. This feature is advantageous because, as can be seen on FIG. 2, the rotor 32R of the first electrical machine is mounted on the external surface of the cylindrical gearing part 20A of the ring component. Therefore, the above feature allows ensuring a proper coaxial position of the rotor with respect to the stator of the electrical machine 32 without imposing too strict manufacturing constraints. It is also worth noting that, in this indirect mounting of the holder 46 on the rigid assembly through another component of the epicyclical gear, the pivot portion of the holder on that other component is located axially substantially together with, and around, the pivot portion of that other component on the rigid assembly. Therefore, as the two pivot portions are not axially offset, it provides more rigidity and compactness to this indirect mounting.

As a result, the first component, here the planet carrier component 22 which comprises the rigid assembly, is guided in rotation on the engine block independently from the holder. In other words, the position of the axle of the first component is primarily determined by its pivot connection on the engine block and not by its connection to the holder. To the contrary, the holder 46 which holds the stator is not directly connected to the engine block when it comes to the position of its axle but is instead closely connected to the first component, so that the position of its axle is closely connected to the position of the first component. This eases the required axial alignment between the rotor and the stator of the first electrical machine This being said, it is nevertheless necessary that the holder is locked in rotation around the main axis A1. Preferably, this is achieved by a link or tether 48 connected directly or indirectly to the engine block, or any other static part. On the other hand, the link connection is preferably configured to be less rigid than the direct or indirect pivot connection of the holder to the engine block when it comes to defining the position of the holder in all directions perpendicular to the main axle A1. In other words, the angular position of the stator 32S with respect to the engine block around the main axis A1 is fixed by the link 48, while the position of the axle of the stator 32S with respect to the engine block is defined through the pivot connection of the holder 46, independently. Link 48 can be in the form of a rod, but could also be formed by two cables oriented in such a way that one of them is tensioned whatever the direction of the torque applied to the electric machine stators.

In the shown embodiment, the holder 46 exhibits an inner tubular portion 46A, which forms the pivot connection portion by which it is mounted, indirectly, on the rigid assembly of the first component, an external tubular portion 46B, which holds the stator 32S of the first electrical machine, and a radial portion 46C which extends between the two tubular portions. Preferably, the outer tubular portion extends axially towards the proximal end from the radial portion 46C and defines an internal volume which encompasses the cylindrical gearing part of the ring component which holds the rotor of the first electrical machine 32 and which itself encompasses the planet gears 24 and radial portion 22R of the planet carrier 22. Thereby, the first electrical machine is arranged concentrically with the planet gears 24 and with radial portion 22R of the planet carrier 22, promoting an axially compact arrangement. On the other hand, the inner tubular portion 46A extends towards the distal end from the radial portion 46C.

In the case where the drive arrangement also comprises a second electrical machine 40 as described above, it may be advantageous to provide that its stator 40S is fixed on the same holder 46 which carries the stator 32S of the first electric machine 32.

In the embodiment of FIG. 2, it can be seen that the outer tubular portion 46B of the holder has also an extension towards the distal end, from the radial portion, for holding the stator 40S of the second electric machine 40. The second electric machine 40 is preferably arranged concentrically around the pivot portions of the holder on the third component and of the third component on the rigid assembly, i.e. not axially offset. On the other hand, the two stators 32S and 40S are located axially each on one side of the radial portion 46C of the holder. Also, the two stators may be for example of the same diameter. Eventually, the two electric machines 32, 40 could be identical. The rotor 40R of the second electrical machine 40 is mounted on an annular bulge which protrudes axially in the proximal direction from the radial flange 30 of the sun component 18. The second rotor 40R is received within the space determined between the outer and inner tubular portions of the holder 46.

In the example shown on FIG. 2, the mechanical lock 38 is arranged between the outer tubular portion 46B of the holder 46 and, because the second component to which the first electrical machine 32 is connected is the ring, the cylindrical gear portion 20A of the ring 20. It is constructed for example as a friction brake or as a dog clutch, and it can be located axially between the radial portion 46C of the holder and first electric machine 32.

Figure 3:
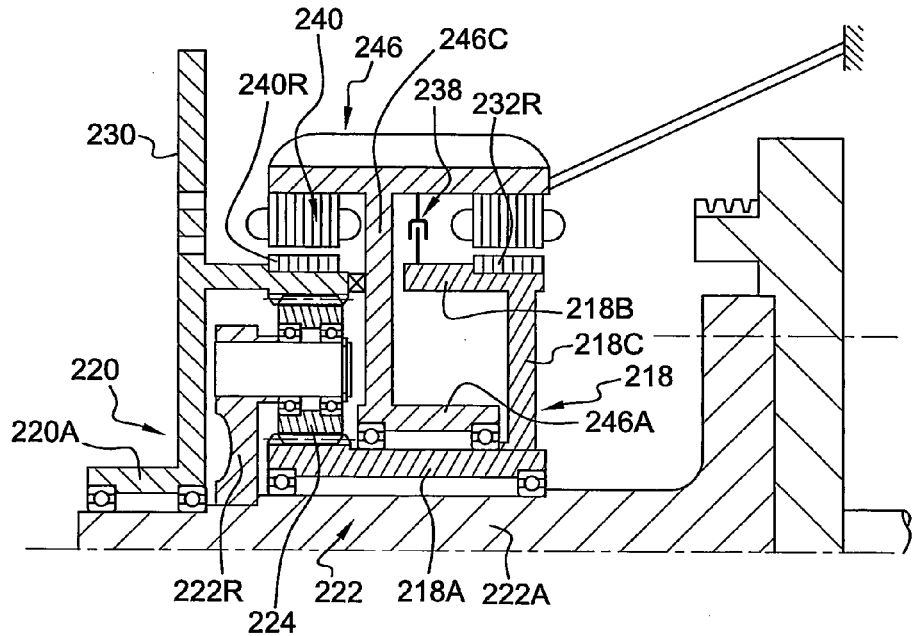

On FIG. 3 is shown a second embodiment of a drive arrangement according to the invention. As it will readily appear to the reader, many of the elements which have been described in reference to FIG. 2 are valid also for this second embodiment and will not be repeated. Only the main differences between the two embodiments will be highlighted. Similar elements will be given the same name and will be indicated by the same reference numbers to which an increment of 200 is added.

In this second embodiment, the second component which is connected to the first electric machine is the sun wheel 218, while the auxiliary equipment is connected to the ring 220 which can therefore be qualified as being the third component of the epicyclical gear. The first component which is connected to the engine remains, as in the first embodiment, the planet carrier 222 which is structurally very similar to the one of the first embodiment. The only difference is that the pins, and the planet gears 224 they receive, are located on the proximal side of the radial part 222R of the rigid assembly. The main structural difference between the two embodiments resides in that the sun component 218 extends axially from the plane of the planet gears 224 in direction of the proximal side, while the ring 220 extends axially from the plane of the planet gears 224 in direction of the distal side.

The sun 218 has an inner tubular portion 218A by which it is mounted on the axial portion 222A of the rigid assembly through two ball bearings, forming a strict pivot connection. At its distal end, the inner tubular portion 218A carries the sun gearing teeth, and at its proximal end, a radial flange 218C for connecting the inner tubular portion 218A to an outer tubular portion 2188 which carries the first electrical machine rotor 232R and the mechanical lock 238. The external tubular portion 218B extends axially in the distal direction from the radial portion 218C.

The ring 220 has a tubular portion 220A by which it is mounted on the distal end of the axial portion 222A of the rigid assembly through two ball bearings, forming a strict pivot connection. At its proximal end, the pivot portion of the ring component 220 has a radial portion which serves as a coupling 230 on which a fan blade can be mounted. The rotor 240R of the second electrical machine 240 is mounted on an annular bulge which protrudes axially in the proximal direction from the radial flange 230 of the ring component. The annular bulge also carries, on an internal surface, the ring gearing teeth.

The holder 246 only differs in that its inner tubular portion 246A extends axially in the proximal direction from its radial portion 246C, and in that it is mounted by a strict pivot connection on the pivot portion 218A of the sun component.

In this embodiment, it can be seen that it is the second electric machine 40 which is arranged concentrically with the planet gears 224 and with the radial portion 222R of the planet carrier 222.

Compared to the first embodiment, the second embodiment may be preferred for driving relatively low speed auxiliary equipment and/or for using a relatively high speed first electric machine to control the speed of the auxiliary equipment.

Figure 4:
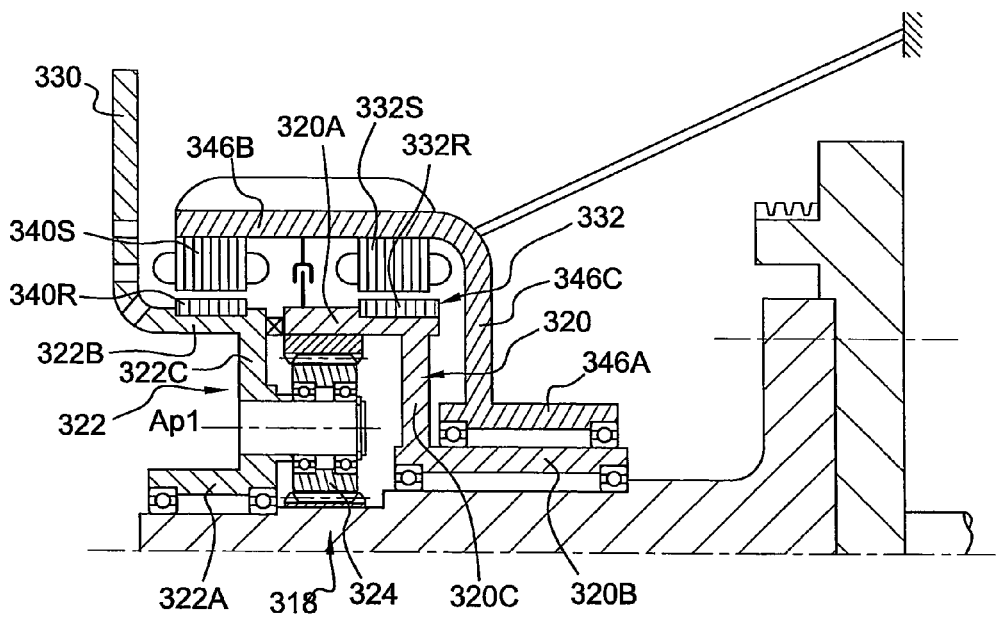

On FIG. 4 is shown a third embodiment of a drive arrangement according to the invention. As it will readily appear to the reader, many of the elements which have been described in reference to FIG. 2 are valid also for this third embodiment and will not be repeated. Only the main differences between the two embodiments will be highlighted. Similar elements will be given the same name and will be indicated by the same reference numbers to which an increment of 300 is added.

In this third embodiment, the first component of the epicyclical drive, which is connected to the engine, is the sun component 318. The second component, which is connected to the rotor 332R of the first electrical machine 332, is the ring component 320, while the carrier 322, which is connected to the auxiliary equipment, is the third component.

The sun component 318 is essentially a rigid assembly similar to the axial part 22A of the first embodiment, i.e. in the form of an axially extending shaft portion having pivot connection portions, but where the radial part 22R is replaced by the sun gearing teeth.

The ring component 320 is essentially similar to the one of the first embodiment. It has a cylindrical gearing portion 320A which has internal gearing teeth for engaging the planet gears, and a pivot portion 320B which is formed as a tube axially offset in the proximal direction from the cylindrical gearing portion and connected to the gearing portion by a radial connecting portion 320C. The cylindrical gearing portion 320A encompasses the planet gears 24. The pivot portion 320B of the ring component is mounted by two ball bearings on a corresponding pivot connection portion of the shaft portion of the rigid assembly which extends axially towards the proximal end from the sun gearing teeth.

The planet carrier component 322 exhibits a tubular portion 322A by which it is mounted on the distal end of shaft portion of the rigid assembly through two ball bearings, forming a strict pivot connection. At its proximal end, the pivot portion 322A of the carrier component 322 has a radial portion 322C which extends radially from the axis A1 and which holds at least one pin, parallel to axis A1 on which a planet gear 324 is rotatably mounted around the axis Ap1 of the pin. The pin extends in the proximal direction from the radial portion 322C so that the planet gear 324 is located on the proximal side of the carrier 322. From the outer periphery of the radial portion 322C, an outer tubular portion 322B extends axially in the distal direction and holds the rotor 340R of the second electric machine. From the distal edge of the outer tubular portion 322C extends a further radial portion which serves as a coupling 330 on which a fan blade can be mounted.

The holder exhibits an inner tubular portion 346A, which forms the pivot connection portion by which it is mounted via two ball bearings on the pivot portion 320B of the ring component and therefore, indirectly, on the rigid assembly of the first component. The holder also comprises an external tubular portion 346B, which holds the stator 332S of the first electrical machine and also holds the stator 340S of the second electric machine, and a radial portion 346C which extends between the two tubular portions from the distal end of the pivot portion 346A. The two tubular portions 346A, 346B are essentially axially offset on each side of radial portion 346C, and, consequently the two stators 332S and 340S are located axially both on the same side of the radial portion 346C of the holder.

Figure 5:
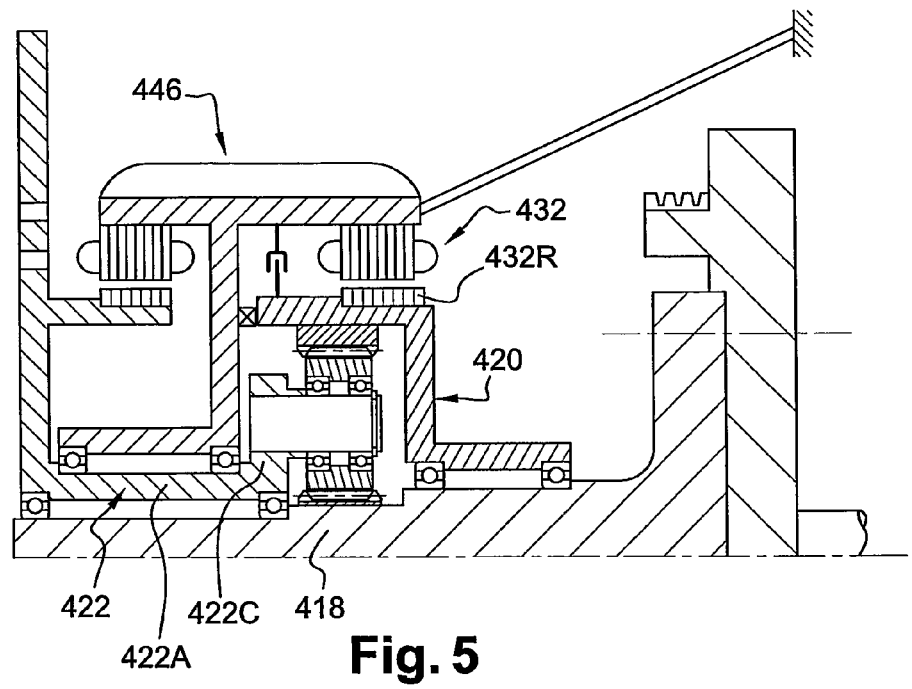

On FIG. 5 is shown a fourth embodiment of a drive arrangement according to the invention. As it will readily appear to the reader, many of the elements which have been described in reference to FIG. 2 are valid also for this fourth embodiment and will not be repeated. Only the main differences between the two embodiments will be highlighted. Similar elements will be given the same name and will be indicated by the same reference numbers to which an increment of 400 is added.

In this fourth embodiment, as in the third embodiment, the first component of the epicyclical drive, which is connected to the engine, is the sun component 418. The second component, which is connected to the rotor 432R of the first electrical machine 432, is the ring component 420, while the carrier 422, which is connected to the auxiliary equipment, is the third component.

Compared to the first embodiment, the ring component 420 has the same structure, and the holder 446 has the same structure and is still mounted on the pivot connection of the third component, the only difference being that the third component is here the planet carrier component 422. This carrier component 422 has essentially the same structure as the sun component of the first embodiment, except that, at the proximal end of its pivot portion 422A, it has a radial 422C portion for holding the planet pins, rather than sun gearing teeth. The sun component 418 is the same as the one of the third embodiment described above.

Figure 6:
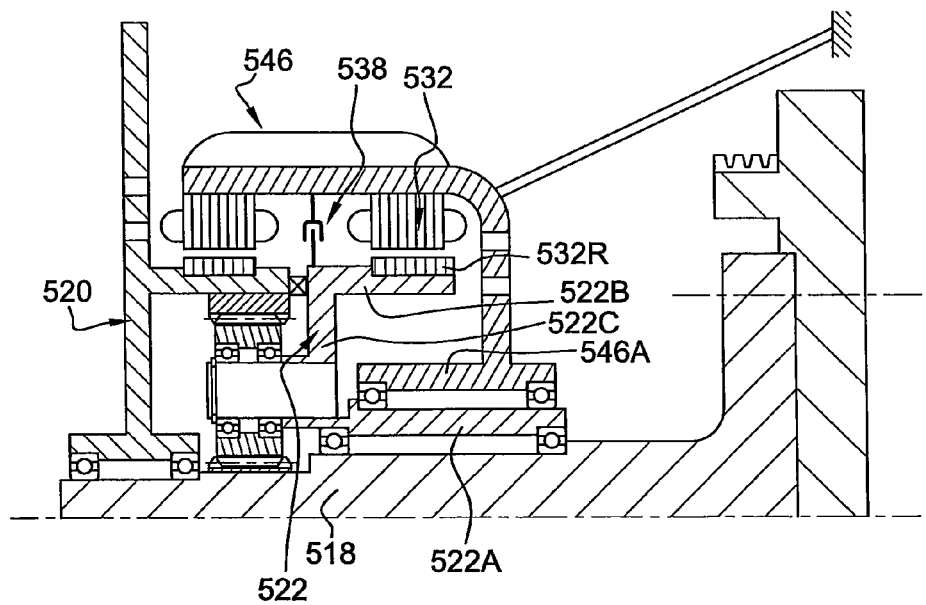

On FIG. 6 is shown a fifth embodiment of a drive arrangement according to the invention. As it will readily appear to the reader, many of the elements which have been described in reference to FIG. 2 are valid also for this fifth embodiment and will not be repeated. Only the main differences between the two embodiments will be highlighted. Similar elements will be given the same name and will be indicated by the same reference numbers to which an increment of 500 is added.

In this fifth embodiment, the first component of the epicyclical drive, which is connected to the engine, is the sun component 518. The second component, which is connected to the rotor 532R of the first electrical machine 532, is the carrier component 522, while the ring 520, which is connected to the auxiliary equipment, is the third component.

The sun component 518 is similar to that of the third and fourth embodiments, while the ring component 520 is similar to that of the second embodiment. The carrier 522 has an inner tubular portion 522A which forms its pivot connection portion by which it is mounted on the shaft portion of the sun component 518. From the distal end of the pivot portion 522A, a radial portion 522C extends away from the axis A1 and holds the planet pins which receive the planet gears. The planet pins extend in the distal direction from the radial portion 522C. From the external periphery of the radial portion 522C, an outer tubular portion 522B extends axially in the proximal direction and holds the rotor 532R of the first electrical machine 532, as well as the mechanical lock 538. The holder 546 is essentially the same as in the third embodiment, except that its pivot portion 546A is mounted on the pivot portion 522A of the carrier.

In all the embodiments described above, the holder is mounted only indirectly on the first component, being in fact mounted directly on one of the other two components. This provision favors the axial compactness. Nevertheless, in some applications, it may be preferable to have the holder directly mounted on the rigid assembly. Also, in all the embodiments above, the second and third components are both mounted directly on the rigid assembly, but, in some applications it may be preferable to have at least one component mounted by a strict pivot connection on the holder or on the other component, thereby being indirectly mounted on the rigid assembly.

The above described drive arrangement has many advantages over the prior art. Compared to the system described in U.S.-2008/0020887 mentioned above, it avoids the double planet system, and its parts are relatively simple in their design, therefore easy to manufacture and easily assembled. Also, it can be recognized that the integration of the electrical machines is made easy and standard machines can be used. The cooling of the stators of those electrical machines can be easily achieved, especially if, as shown on the Figures, cooling ribs 50 are provided on the external surface of the holder 46.

Also, it can be noted that both electrical machines are on the same side with respect to the output of the system, in the example the third coupling 30. This can be important for the routing of the electrical cables to the stator of the electric machines, and this means that the third coupling is not an obstacle for routing the cables to e.g. an engine mounted alternator. The cables could for example be attached to the link rod 48. If that were not the case, routing the cables, around e.g. a fan, could be problematic, or at least would require a more expensive solution.

In the above embodiments, the strict pivot connection between two parts as been represented by the use of two ball bearings because such arrangement is typical of the strict pivot connection and because a connection through a single pivot connection is typically regarded in mechanical terms as a ball type connection because of its inability to properly rigidly connect two parts in rotation perpendicularly to its axis. Of course, the skilled man in that art can devise other constructions for a strict pivot connection, such as replacing at least one of such bearings by a roller bearing, or by a bushing.

In the context of the invention, the term vehicle includes not only transportation vehicles for transporting people or goods but also construction equipment machines such as excavators, haulers, loaders, etc. . .

The invention claimed is:

1. Drive arrangement at least one auxiliary equipment of an internal combustion engine having an engine block and a rotating output member, wherein the drive arrangement comprises an epicyclical gear having three main components comprising a sun gear, a ring gear and a planet carrier, and wherein:
   a first component of the components adapted to be connected to the engine rotating output member,
   a second component of the components adapted to be connected to the rotor of a first electric machine having also a stator, and
   a third component of the components adapted to be connected to the at least one auxiliary equipment, wherein the first component is guided in rotation by a strict pivot connection on the engine block and comprises a rigid assembly which supports the other two components,
   wherein the stator of the first electric machine is fixed on a holder, the holder being guided in rotation by a strict pivot connection directly or indirectly on the first component rigid assembly, and the first component is guided in rotation on the engine block independently from the holder, and wherein the holder is mounted indirectly on the rigid assembly through another component of the epicyclical gear, the strict pivot connection of the holder on that other component being located axially substantially together with, and around, the strict pivot connection of that other component on the rigid assembly.

2. Drive arrangement according to claim 1, wherein the second and third main components are each mounted directly or indirectly on the first component rigid assembly through a strict pivot connection.

3. Drive arrangement according to claim 2, wherein the second and/or the third main component is/are mounted directly on the first component rigid assembly through a strict pivot connection.

4. Drive arrangement according to claim 1, wherein the holder is locked in rotation around the main axis by a link connected to a static part.

5. Drive arrangement according to claim 4, wherein the holder is locked in rotation around the main axis by a link connected directly or indirectly to the engine block, and in that the link connection is less rigid than the direct or indirect pivot connection of the holder to the engine block.

6. Drive arrangement according to claim 1, comprising a second electric machine which is connected to the third coupling.

7. Drive arrangement according to claim 6, wherein the second electric machine comprises a stator which is fixed on the same holder which carries the stator of the first electric machine.

8. Drive arrangement according to claim 1, wherein the rigid assembly of the first component is directly attached as an extension to the engine output shaft.

9. Drive arrangement according to claim 1, wherein the planet carrier has at least one radial extension which carries at least one planet gear, in that the sun gear and ring gear are guided in rotation with respect to the planet carrier through a respective strict pivot portion, and in that the strict pivot portions of the sun gear and of the ring gear are respectively substantially located axially on one side and on the other side of the radial extension of the planet carrier.

10. Drive arrangement according to claim 1, wherein the rigid assembly comprises a part in the form of a shaft extending along an axis on which are formed pivot connection portions for supporting directly or indirectly all the other components of the drive assembly in a strict pivot connection.

11. Drive arrangement according to claim 1, wherein the at least one auxiliary equipment comprises an engine cooling fan.

12. Drive arrangement for at least one auxiliary equipment of an internal combustion engine having an engine block and a rotating output member, wherein the drive arrangement comprises an epicyclical gear having three main components comprising a sun gear, a ring gear and a planet carrier, and wherein:

- a first component of the components adapted to be connected to the engine rotating output member,
- a second component of the components adapted to be connected to the rotor of a first electric machine having also a stator, and
- a third component of the components adapted to be connected to the at least one auxiliary equipment, wherein the first component is guided in rotation by a strict pivot connection on the engine block and comprises a rigid assembly which supports the other two components, wherein the stator of the first electric machine is fixed on a holder, the holder being guided in rotation by a strict pivot connection directly or indirectly on the first component rigid assembly, and the first component is guided in rotation on the engine block independently from the holder, wherein the second component is provided with a mechanical lock which can be controlled to lock the rotation of the second component around the axis of the epicyclical gear.

13. Drive arrangement according to claim 12, wherein the mechanical lock locks the second component to the holder on which the stator of the first electric machine is fixed.

* * * * *